United States Patent
Johnson et al.

[11] Patent Number: 6,151,990
[45] Date of Patent: Nov. 28, 2000

[54] HYDROSTATIC TRANSAXLE HAVING A CASING SPLIT ALONG ONE OR MORE VERTICAL PLANES

[75] Inventors: Kevin J. Johnson; Norman E. Jolliff, both of Salem; Vance E. Coble, Campbellsburg, all of Ind.

[73] Assignee: Tecumseh Products Company, Tecumseh, Mich.

[21] Appl. No.: 09/302,312

[22] Filed: Apr. 29, 1999

Related U.S. Application Data

[60] Provisional application No. 60/086,399, May 22, 1998, and provisional application No. 60/084,454, May 6, 1998.

[51] Int. Cl.$^7$ .............................. F16H 57/02; F16H 47/04
[52] U.S. Cl. .............................. 74/606 R; 475/72; 475/73
[58] Field of Search .............................. 74/606 R; 475/72, 475/83

[56] References Cited

U.S. PATENT DOCUMENTS

| | | | |
|---|---|---|---|
| 2,027,356 | 1/1936 | Erling | 103/38 |
| 2,111,659 | 3/1938 | Benedek | 103/161 |
| 2,163,079 | 6/1939 | Benedek | 60/53 |
| 2,307,851 | 1/1943 | Musick et al. | 103/120 |
| 3,404,584 | 10/1968 | Trautmann | 74/687 |
| 3,751,924 | 8/1973 | Brown et al. | 60/485 |
| 3,770,075 | 11/1973 | Vegners | 180/66 |
| 4,091,717 | 5/1978 | Bojas et al. | 91/498 |
| 4,616,478 | 10/1986 | Jensen | 60/487 |
| 4,627,237 | 12/1986 | Hutson | 60/487 |
| 4,686,829 | 8/1987 | Thoma et al. | 60/464 |
| 4,784,013 | 11/1988 | Yamaoka et al. | 74/606 R |
| 4,862,767 | 9/1989 | Hauser | 74/687 |
| 4,934,252 | 6/1990 | Giere | 91/497 |
| 4,968,227 | 11/1990 | Szulczewski et al. | 417/440 |
| 5,136,845 | 8/1992 | Woodley | 60/468 |
| 5,218,886 | 6/1993 | Louis et al. | 74/606 R |
| 5,279,206 | 1/1994 | Krantz et al. | 91/497 |
| 5,289,738 | 3/1994 | Szulczewski | 74/606 R |
| 5,473,964 | 12/1995 | Okada et al. | 74/606 R |
| 5,505,279 | 4/1996 | Louis et al. | 180/305 |
| 5,613,409 | 3/1997 | Hauser | 74/606 R |
| 5,617,764 | 4/1997 | Komura et al. | 74/606 R |
| 5,622,052 | 4/1997 | Fahnle et al. | 60/487 |
| 5,636,555 | 6/1997 | Okada et al. | 74/606 R |
| 5,676,034 | 10/1997 | Krantz | 92/12.1 |
| 5,743,144 | 4/1998 | Krantz | 74/405 |
| 5,752,417 | 5/1998 | Okada et al. | 74/606 R |
| 5,768,955 | 6/1998 | Hauser | 74/606 R |
| 5,771,758 | 6/1998 | Hauser | 74/606 R |
| 5,971,881 | 10/1999 | Jolliff | 475/89 |

*Primary Examiner*—Charles A. Marmor
*Assistant Examiner*—Tisha D. Waddell
*Attorney, Agent, or Firm*—Baker & Daniels

[57] ABSTRACT

A fully integrated hydrostatic transaxle formed of three housing members, a hydrostatic transmission and axle housing member joined to a differential housing member along a vertical plane and joined to a hydrostatic transmission mounting plate and cover member along a horizontal plane. A hydrostatic transmission is connected to and suspended from the mounting plate and cover member. In a second embodiment, a hydrostatic transmission is mounted to a hydrostatic transmission and axle housing member, which in turn is fastened to a center housing member. The center housing member is in turn connected to an axle and differential housing member. The interfaces defined by where the housing members are joined together define substantially parallel vertical planes. Means for effectively unlocking the transmission and the differential is provided so that the operator can push the vehicle without encountering the resistance of back driving the hydrostatic transmission. A neutral position adjustment mechanism provides a tactile indication of the neutral position, and the mechanism can be readjusted to define the correct neutral position.

21 Claims, 12 Drawing Sheets

FIG_1

FIG_6

FIG_9

FIG_10

HYDROSTATIC TRANSAXLE HAVING A CASING SPLIT ALONG ONE OR MORE VERTICAL PLANES

RELATED APPLICATIONS

This application claims priority from provisional application Ser. No. 60/086,399 filed May 22, 1998, and also claims priority from provisional application Ser. No. 60/084,454 filed May 6, 1998.

BACKGROUND OF THE INVENTION

The present invention relates to hydrostatic transaxles intended primarily for use in the lawn and garden industry on riding lawnmowers, lawn and garden tractors and the like.

Hydrostatic transmissions transmit rotary mechanical motion, typically from an internal combustion engine, to fluid motion, typically oil, and then back to rotary mechanical motion to rotate a pair of drive axles in order to drive the vehicle. The hydrostatic transmission controls the output rotary mechanical motion such that varying output speeds in the forward and reverse directions are possible with a single speed input rotary mechanical motion.

Such transmissions have utilized radial piston pumps and motors, axial piston pumps and motors and hybrid transmissions wherein the pump may be of the radial piston design, for example, and the motor formed as a gear pump. The speed of the output of the transmission is typically controlled by varying the eccentricity of the pump track ring or swash plate.

In recent years, it has been common practice to integrate the hydrostatic transmission within the axle housing that also contains the differential and bearings for the two axles. Such housings are typically split along a horizontal plane containing the axis of the axles, and the housing itself is formed of only two parts. Prior designs have also utilized housings having three or more components wherein the housing components attach to each other along vertical split lines or horizontal and vertical split lines.

SUMMARY OF THE INVENTION

The present invention is a fully integrated hydrostatic transaxle wherein, according to one embodiment, the housing is formed of three housing members: a hydrostatic transmission and axle housing member joined to a differential axle housing member along a vertical plane and joined to a hydrostatic transmission mounting plate and cover member along a horizontal plane. The mounting plate and cover member serves as the sole support for the hydrostatic transmission and is integrated therewith in that it provides a retaining surface for the cylinder barrel of the pump and provides machined guide surfaces for the track ring, which moves rectilinearly in order to change the eccentricity of the slipper path relative to the axes of the input shaft.

In another form thereof, the present invention provides a hydrostatic transaxle comprising an external casing. A pair of axles in a differential are disposed in the casing. The casing comprises first and second housing members joined together along a first interface which lies in a first plane. The first and second housing members contain a hydrostatic transmission. A third housing member is joined to at least one of the first and second housing members along a second interface which lies in a second plane. The second plane is substantially vertical and intersects the differential.

In one preferred form, the first plane is substantially parallel to the second plane. In a second preferred form, the first plane is substantially perpendicular to the second plane. More particularly, in the preferred form wherein the first plane is substantially parallel to the second plane, the three housing members are arranged as follows: the hydrostatic transmission is mounted to a hydrostatic transmission and axle housing member, which is in turn fastened to a center housing member. The center housing member is in turn connected to an axle and differential housing member.

Advantageously, the hydrostatic transmission itself is of very compact design and employs a radial piston pump driven by the input shaft and a gear motor mounted to the pintle block, the gear motor having an output shaft that drives a very compact planetary set in order to accomplish speed reduction. The output of the planetary set drives the ring gear of the differential and is connected to an external brake disc.

In another preferred form, the present invention provides a means for selectively unlocking the ring gear, which in turn allows the ring gear to rotate and effectively disconnect the hydrostatic transmission and the differential. Specifically, the ring gear comprises a plurality of slots disposed thereon, and a pin is slidably disposed within a bore defined by the casing. The pin can selectively engage any one of the slots, and in so doing, prevents the ring gear from rotating. Disengagement of the pin unlocks the ring.

In yet another preferred form, the present invention provides a neutral position adjustment mechanism. The mechanism comprises a slidable track ring having a first detent member extending therefrom. One of the first and second housing members define a second detent member adapted to releasably receive the first detent member. The second detent member has an adjustable position, whereby the second detent member can be positioned so that the transaxle is in neutral when the first detent member is received in the second detent member. Advantageously, this neutral position adjustment mechanism provides the operator with a tactile indication of when neutral is achieved.

DETAILED DESCRIPTION

Figure 1:
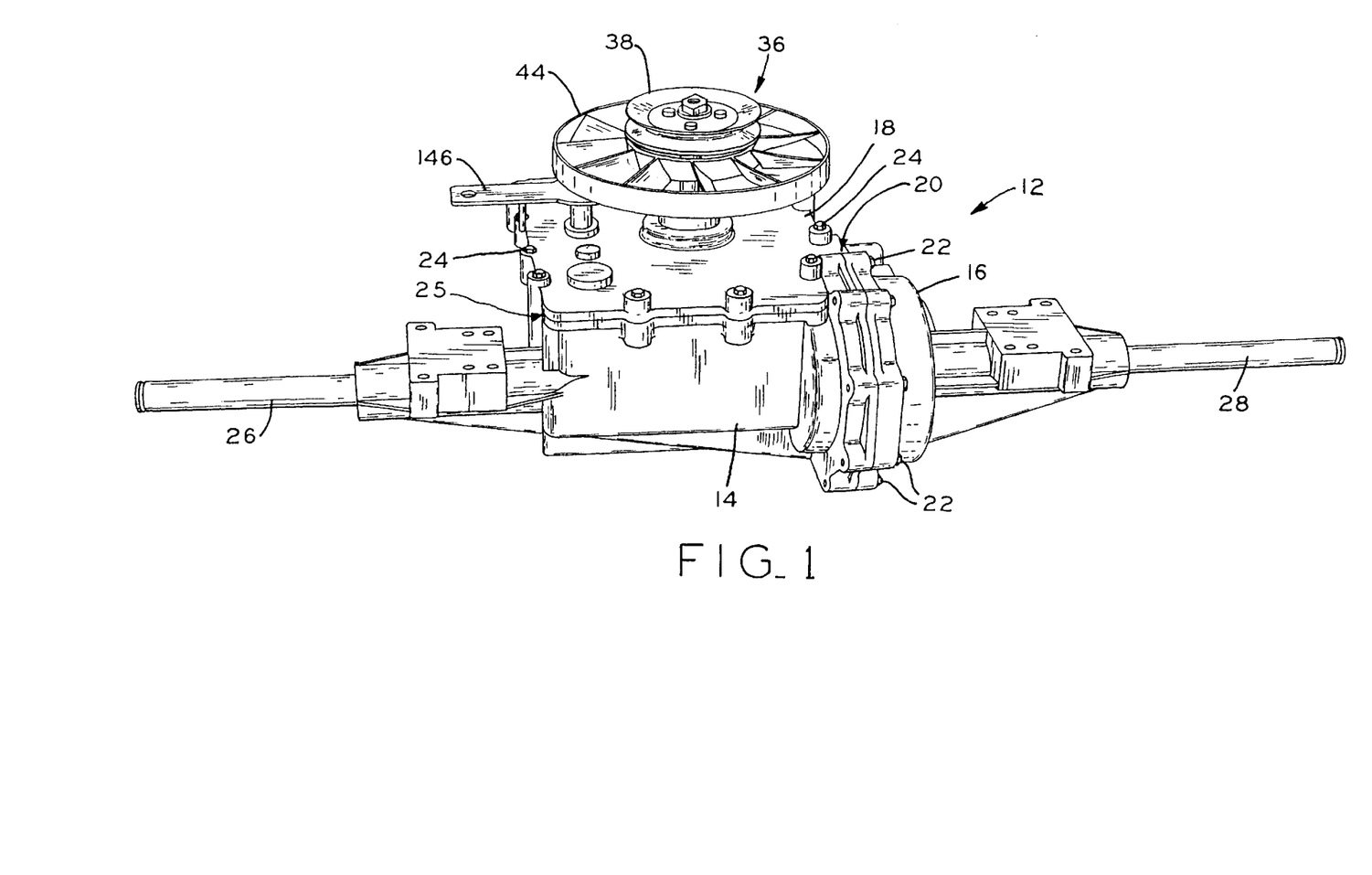
FIG. 1 is a perspective view of the hydrostatic transmission in accordance with one embodiment of the present invention.

Referring first to FIG. 1, transaxle 12 comprises a casing consisting of three housing members, hydrostatic transmission and axle housing member 14, axle and differential housing member 16 and hydrostatic transmission mounting plate and cover member 18. Housing members 14 and 16 are connected together by a series of bolts 22 and define an interface 20 therebetween that is in a vertical plane. The third housing member, mounting plate and cover 18, is joined to housing member 14 by a series of bolts 24 and defines an interface therebetween that lies in a substantially horizontal plane. Axles 26 and 28 extend out of machined bores 30 and 32 (FIG. 2) in housings members 16 and 14, respectively, and are supported by means of bearings 34. A pulley and fan assembly 36 (FIG. 4) comprises a pulley 38 that is typically driven by a belt (not shown) leading from the engine, and pulley 38 is connected to fan hub 40 by means of a plurality of screws 42. Plastic cooling fan 44 is riveted to hub 40, and the entire assembly is rigidly connected to input shaft 46 so that input shaft 46 is rotated thereby. The lower end 48 of input shaft 46 is rectangular in cross-section and is connected to an Oldham coupling 50 that is connected in turn to the cylinder barrel 52 of radial piston pump 54.

Figure 4:
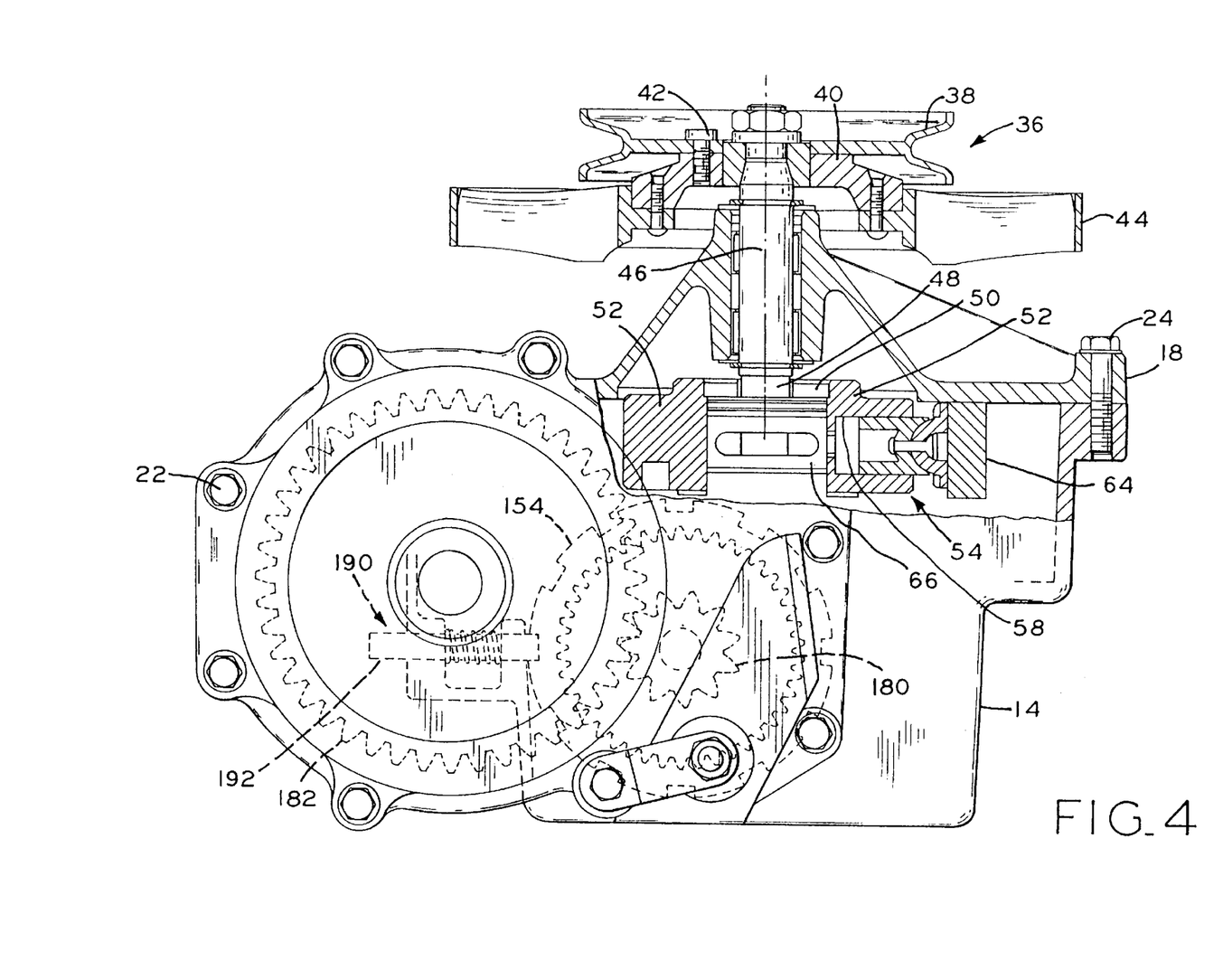
FIG. 4 is an elevational view partially in section illustrating the input pulley and an assembly and the radial piston pump.
Figure 5:
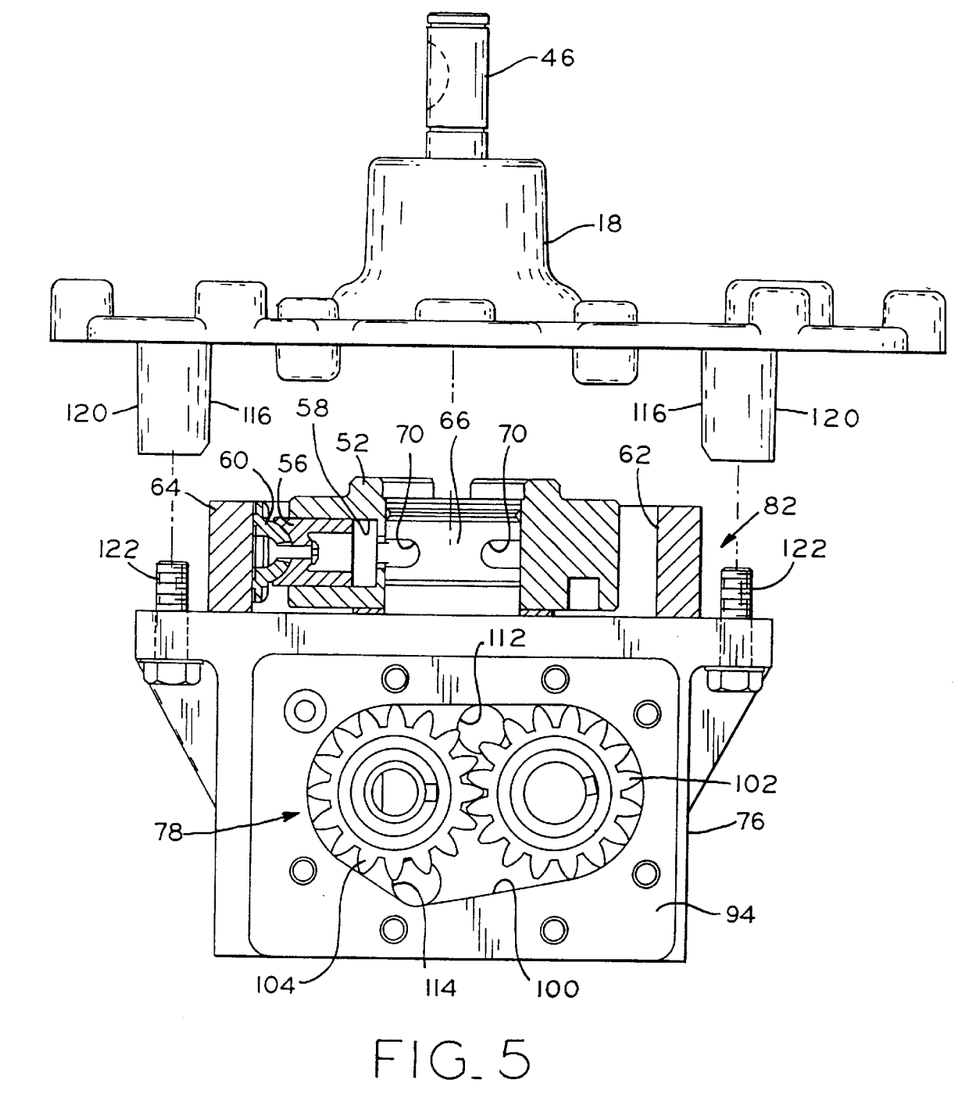
FIG. 5 is an exploded view partly in section of the mounting plate/cover and the hydrostatic transmission.
Figure 6:
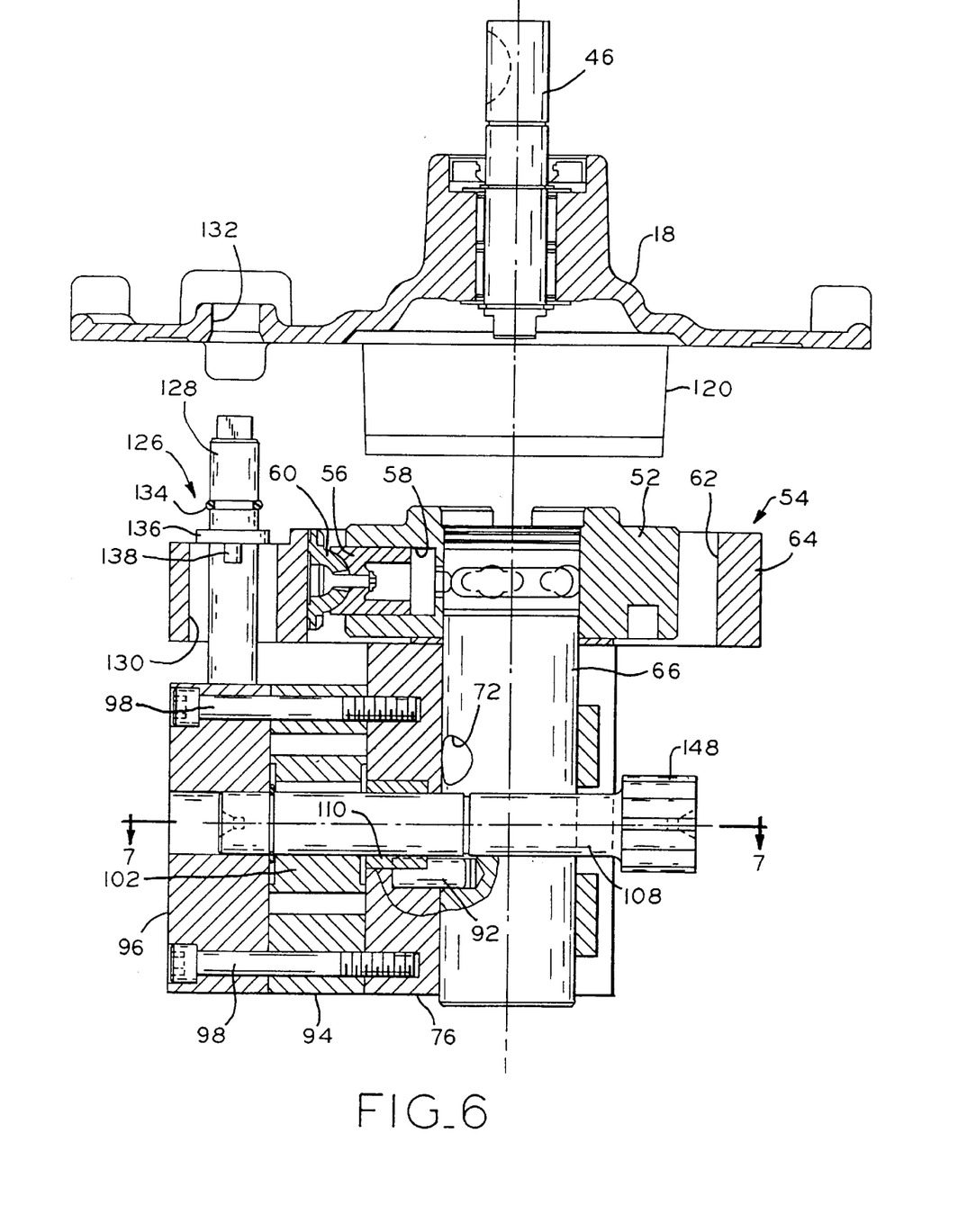
FIG. 6 is an exploded sectional view illustrating the mounting plate and cover and the hydrostatic transmission.

With reference to FIGS. 4, 5 and 6, it will be seen that hydrostatic pump 54 is of relatively conventional design and comprises a plurality of pistons 56 received in bores 58, and slippers 60 that are connected to pistons 56 and which ride against the inner surface 62 of track ring 64. A pintle 66 (FIG. 10) includes a pair of longitudinal bores 68 having ports 70 at the upper end thereof for communication with bores 58 in cylinder barrel 52 and a pair of ports 72 and 74 that connect through pintle block 76 to the gear motor 78 (FIG. 5). A pair of check valves 80 are pressed in the lower end of pintle 66 and serve to permit make-up fluid to be conveyed to hydrostatic transmission 82 in a manner well known in the art. Check valves 80 comprise housings 84 and balls 86.

Figure 7:
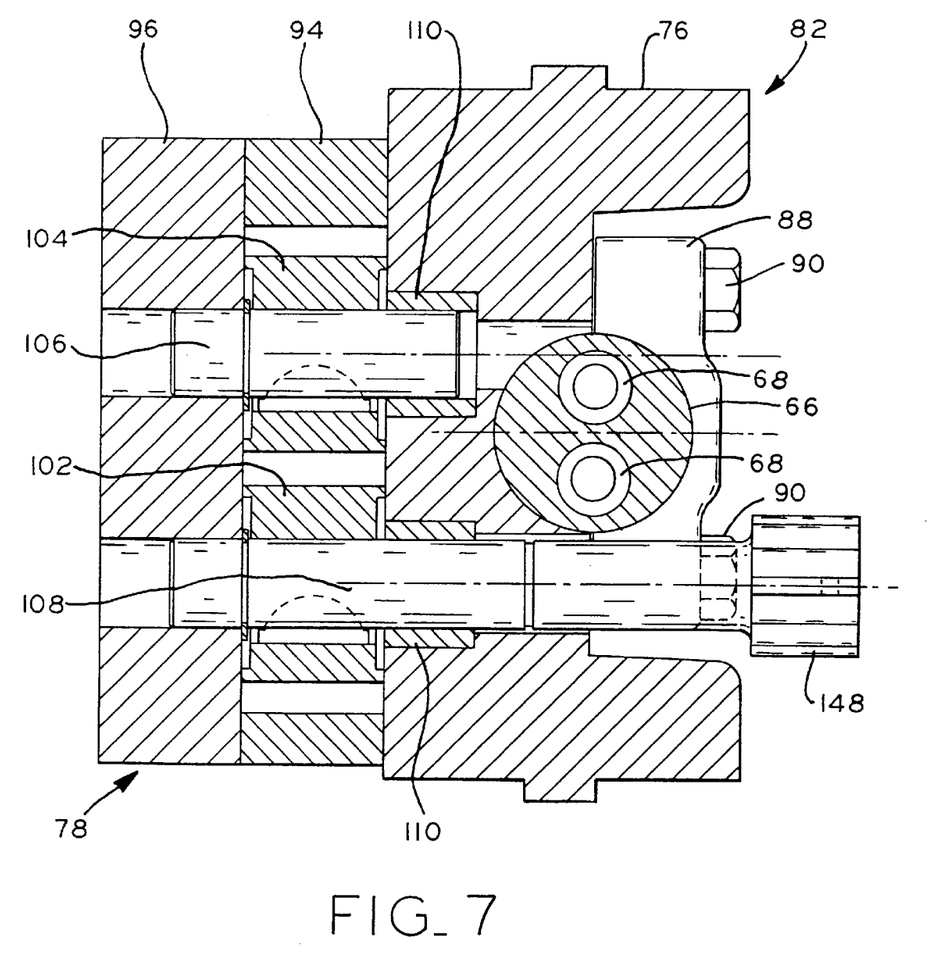
FIG. 7 is a sectional view taken along the line 7—7 of FIG. 6 and viewed in the direction of the arrows.
Figure 10:
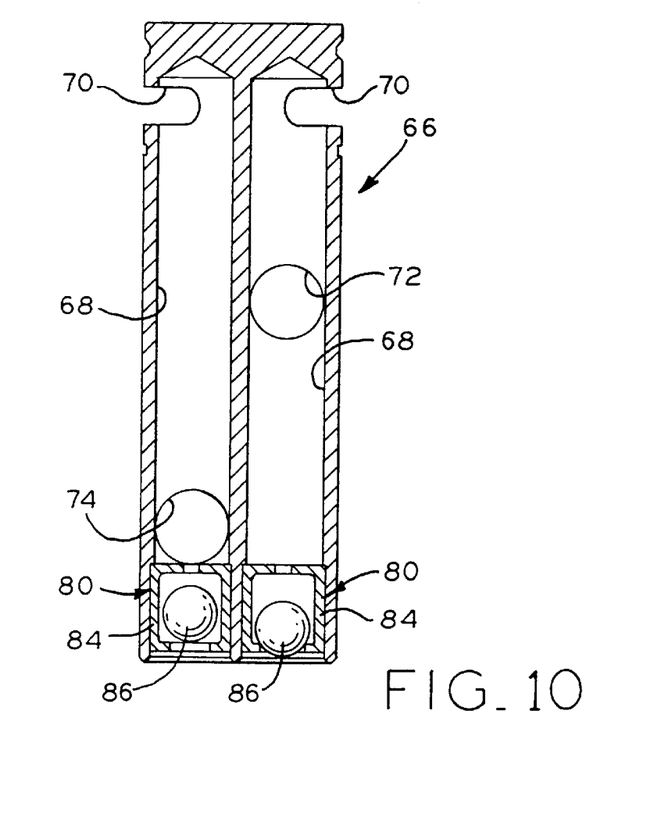
FIG. 10 is an enlarged sectional view of the pintle.

Referring now to FIGS. 5, 6 and 7, it will be seen that pintle 66 is fastened to pintle block 76 by means of a saddle clamp 88 and screws 90. Dowel 92 (FIG. 6) holds pintle 66 against rotation relative to pintle block 76. As shown in FIG. 5, mounted to the left hand face of pintle block 76 is gear motor 78, which comprises center section 94 (FIG. 6) and cover plate 96 (not shown in FIG. 5), which are fastened to pintle block 76 by means of a plurality of screws 98. Center section 94 of gear motor 78 includes a chamber 100 in which are disposed a pair of pump gears 102 and 104, wherein pump gear 104 is an idler gear and is keyed to idler shaft 106 (FIG. 7) and pump gear 102 is keyed to pump output shaft 108. Shafts 106 and 108 are supported within a pair of bushings 110. The chamber 100 of gear motor 78 communicates with the interior of pintle 66 by means of an input port 112 (FIG. 5) in pintle block 76 and output port 114 in pintle block 76 and ports 72 and 74, respectively, in pintle 66 (FIGS. 7 and 10). Thus, when operating in the forward direction, the rotation of pump cylinder barrel 52 causes reciprocation of pistons 56 thereby pressurizing the fluid within bore 68 of pintle 66. This pressurized fluid passes through pintle port 72 and inlet port 112 to gear motor 78, causes rotation of pump gear 102 and then flows out of gear pump 78 through port 114 and back into pintle 76 through port 74. Under reverse rotation conditions, an opposite flow of oil is achieved. It can be appreciated that the input shaft 46 (FIG. 4) defines an input shaft axis which is substantially vertical. Output member, or output shaft 108 defines an output shaft axis being substantially orthogonal to the input shaft axis.

Figure 8:
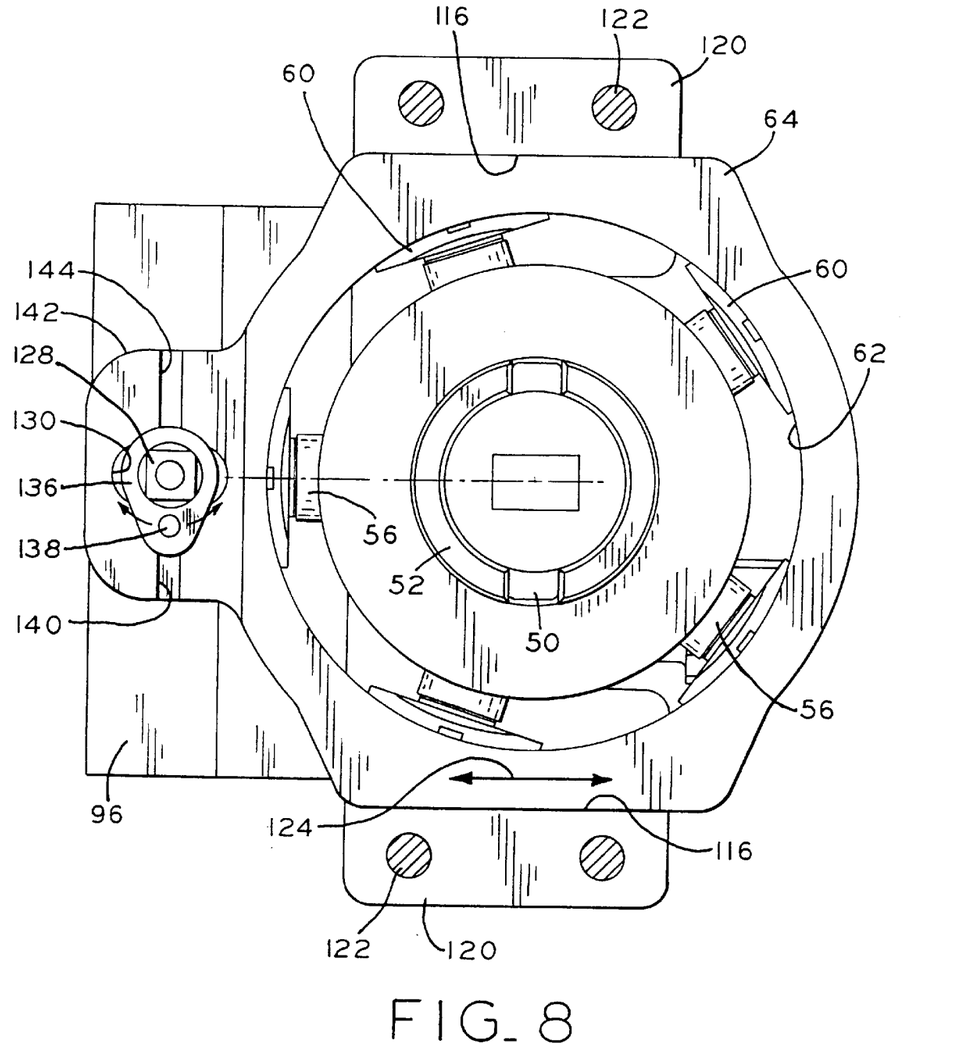
FIG. 8 is a top plan view of the hydrostatic transmission.
Figure 9:
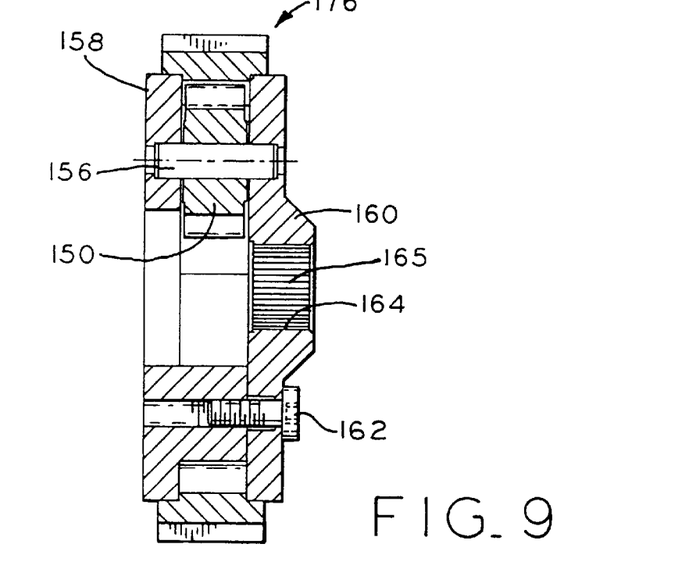
FIG. 9 is an enlarged sectional view of the planetary set.

FIGS. 6 and 8 illustrate the control mechanism for hydrostatic transmission 82. Track ring 64 is captured between and guided by a pair of machined surfaces 116 on mounting blocks 120 that are integral with and depend from mounting plate and cover 18. Mounting blocks 120 also serve as the elements from which transmission 82 is suspended by means of four mounting bolts 122 (FIG. 5). Rather than rotating about a fixed pivot point, track ring 64 is guided for rectilinear motion as indicated by arrows 124. This rectilinear motion is accomplished by means of the control mechanism 126 which comprises shaft 128 that extends through opening 130 in track ring 64 and is supported for rotation by cover plate 96 and a bore 132 in mounting plate and cover 18. O-ring 134 seals the interface between shaft 128 and opening 132. Rigidly connected to shaft 128 is a control arm 136 having a downwardly extending pin 138 connected thereto, pin 138 being captured in a slot 140 in the extending ear portion 142 of track ring 64. Thus, as shaft 128 is rotated, pin 138, by virtue of its engagement with slot 140, will cause track ring 64 to move along a rectilinear path indicated by arrows 124, thereby changing the eccentricity between the interior guide surface 62 of track ring 64 and the axis of input shaft 46. Track ring 64 is provided with a second slot 144 on the opposite side of control shaft 128, so that depending on the orientation of the control linkage from the lawn and garden tractor (not shown), forward and reverse operation can be reversed merely by rotating control arm 136 so that pin 138 is in either slot 140 or slot 144. A suitable spring biased return-to-neutral mechanism (not shown) would also be provided so that when the control lever on the lawn and garden tractor is released, control shaft 128 will return to its neutral position. Control shaft 128 is connected to control lever 146 (FIG. 1), which is in turn connected to the control linkage of the lawn and garden tractor.

The output gearing of the transaxle will now be described with particular reference to FIGS. 2, 3, 4 and 6. As shown in FIG. 6, output shaft 108 from gear pump 78 is provided on its end with an integral sun gear 148 (FIG. 3), and sun gear 148 is in intermeshing engagement with three planet gears 150 that are in turn in intermeshing engagement with the internal gear 152 of cog ring 154. Planet gears 150 are rotatably supported by means of shafts 156 that are pressed into planet carrier 158 and planetary output drive 160. Planet carrier 158 and output drive 160 are fastened together by means of a plurality of screws 162, thereby capturing planet gears 150 therebetween.

Output drive 160 is provided with a splined opening 164 that is connected to splined end 165 of output shaft 166 (FIG. 2) that is supported by means of bearings in main axle housing member 14 and axle and differential housing member 16. The end 168 of output shaft is also splined and connected to brake disc 170, which is selectively engaged by a pair of brake pads (not shown) in a fashion commonly utilized in lawn and garden transaxles. The brake pads are forced inwardly against brake disc 170 through the action of a cam lever 172 engaging a pair of pins 174 as illustrated in FIG. 2.

Planetary set 176 accomplishes the necessary speed reduction between the output of gear motor 78 and the drive for differential 178, thereby permitting pump 54 to be driven at input speed. The planetary gear reduction is extremely compact, as contrasted with prior art output gearing that requires the use of countershafts and a series of pinion gears. It will be noted that the axis of output shaft 166 is very close to the axis of differential 178 (FIG. 2), and that the interface between housing members 14 and 16 defines a plane which intersects differential 178. Differential drive pinion 180 is keyed to output shaft 166 and drives differential ring gear 182 in the usual fashion. Differential 178 is conventional in nature and comprises pin 184 connected to bevel gears 186, the latter being in intermeshing engagement with bevel gears 188 connected to axles 26 and 28.

Figure 3:
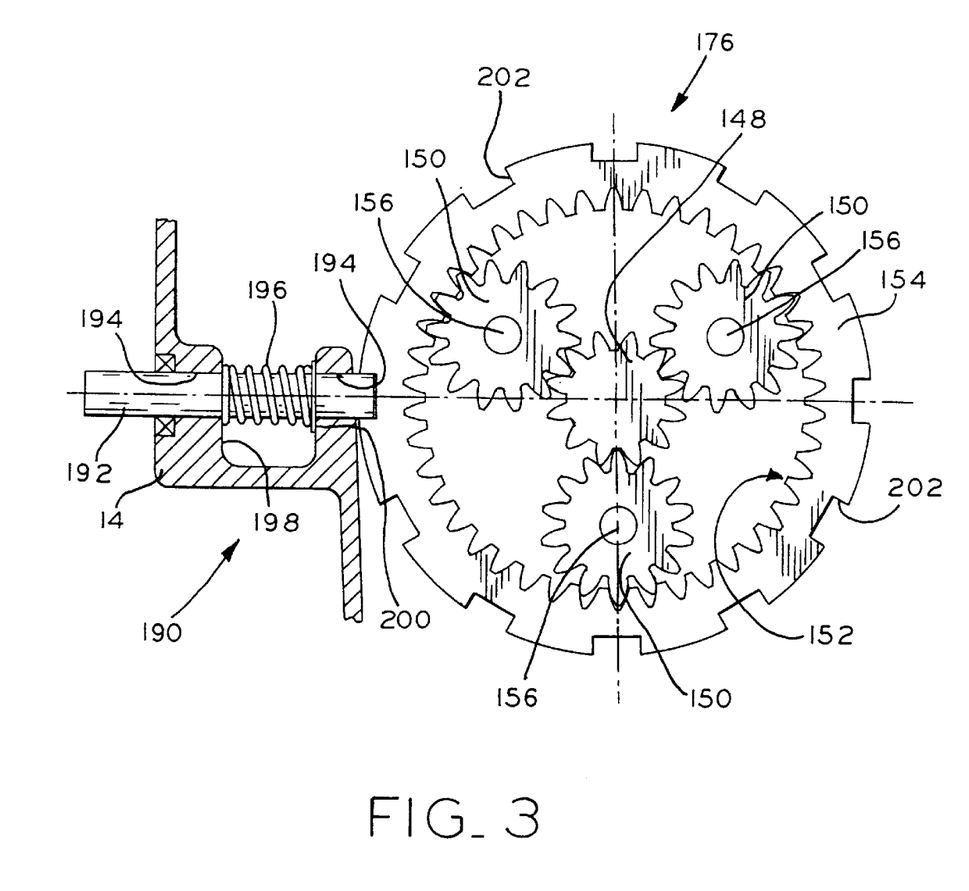
FIG. 3 is an enlarged fragmentary view illustrating the planetary set and disconnect mechanism.

FIGS. 3 and 4 illustrate the hydrostatic transmission disconnect mechanism 190 that permits axles 26, 28 and hydrostatic transmission 82 to be disconnected so that the vehicle can be pushed manually without having to encounter the resistance of back driving the hydrostatic transmission 82. Disconnect mechanism 190 comprises a pin 192 disposed in a pair of bores 194 defined by housing member 14 of the transaxle casing. A snap ring 200 is disposed within a groove in pin 192 and serves to capture return spring 196, the latter causing pin 192 to remain engaged with one of the slots 202 in cog ring 154. Spring 196 is received within a recess 198 in housing 14. When pin 192 is engaged with one of the slots in cog ring 154, cog ring 154 will be held against rotation so that the rotation of gear pump output shaft 108 and integral sun gear 148 will cause planet gears 150 to rotate and "walk around" internal gear 152, thereby rotating planetary output drive 160 and output shaft 166. However, when pin 192 is retracted, cog ring 154 will be permitted to rotate so that the rotational motion of planetary output drive 160 caused by rotation of axles 26 and 28 and differential 178 as the tractor is pushed will cause planet gears 150 to walk around sun gear 148 rather than driving sun gear 148 and gear pump output shaft 108.

Figure 2:
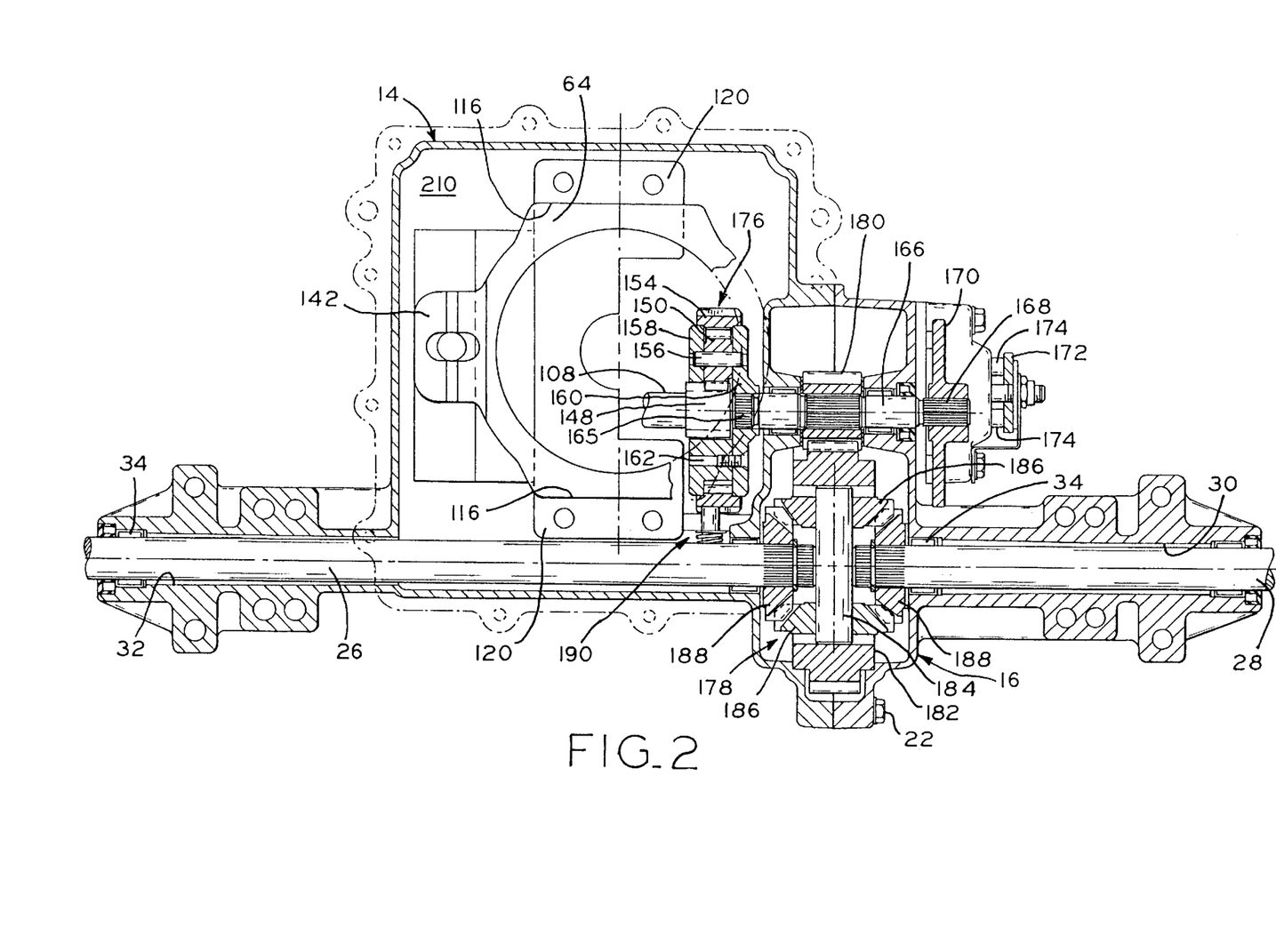
FIG. 2 is a sectional view of the transaxle taken along a horizontal plane intersecting the axes of the axles.

As shown in FIG. 2, chamber 210, which is formed as an extension of main axle housing member 14, contains the oil for hydrostatic transmission 82. This same oil is utilized to lubricate differential 178.

Referring now to FIGS. 1–13, a second embodiment of the transaxle according to the present invention is disclosed wherein elements that are common to the embodiment of FIGS. 1–10 are numbered the same but differentiated by a prime symbol. Unlike the embodiment of FIGS. 1–10, the transaxle casing 220 is split along two vertical interfaces 221, 223 and comprises a differential and axle housing member 16', a center housing member 222 and transmission and axle housing member 224. Members 224 and 222 are joined to each other along interface 223 lying in a vertical plane perpendicular to axles 26' and 28' and are fastened together by means of a plurality of bolts 226. Center section 222 and axle housing 16' are joined at interface 221 lying in a second vertical plane parallel to the plane of interface 223 and are fastened together by a second plurality of bolts 228 (FIG. 13).

Figure 11:
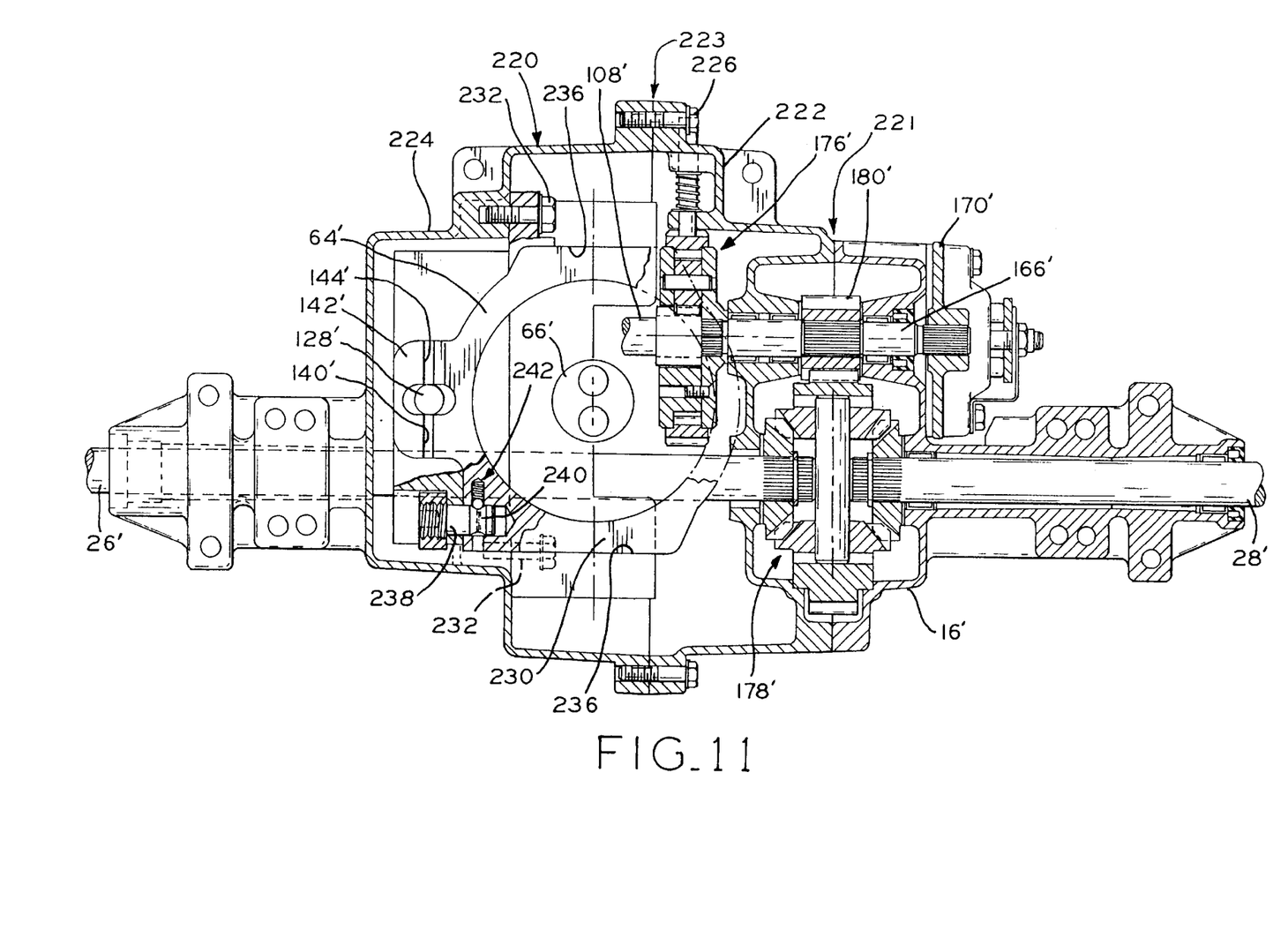
FIG. 11 is a sectional view of a transaxle according to a second embodiment of the invention taken along a horizontal plane intersecting the axes of the axles.
Figure 12:
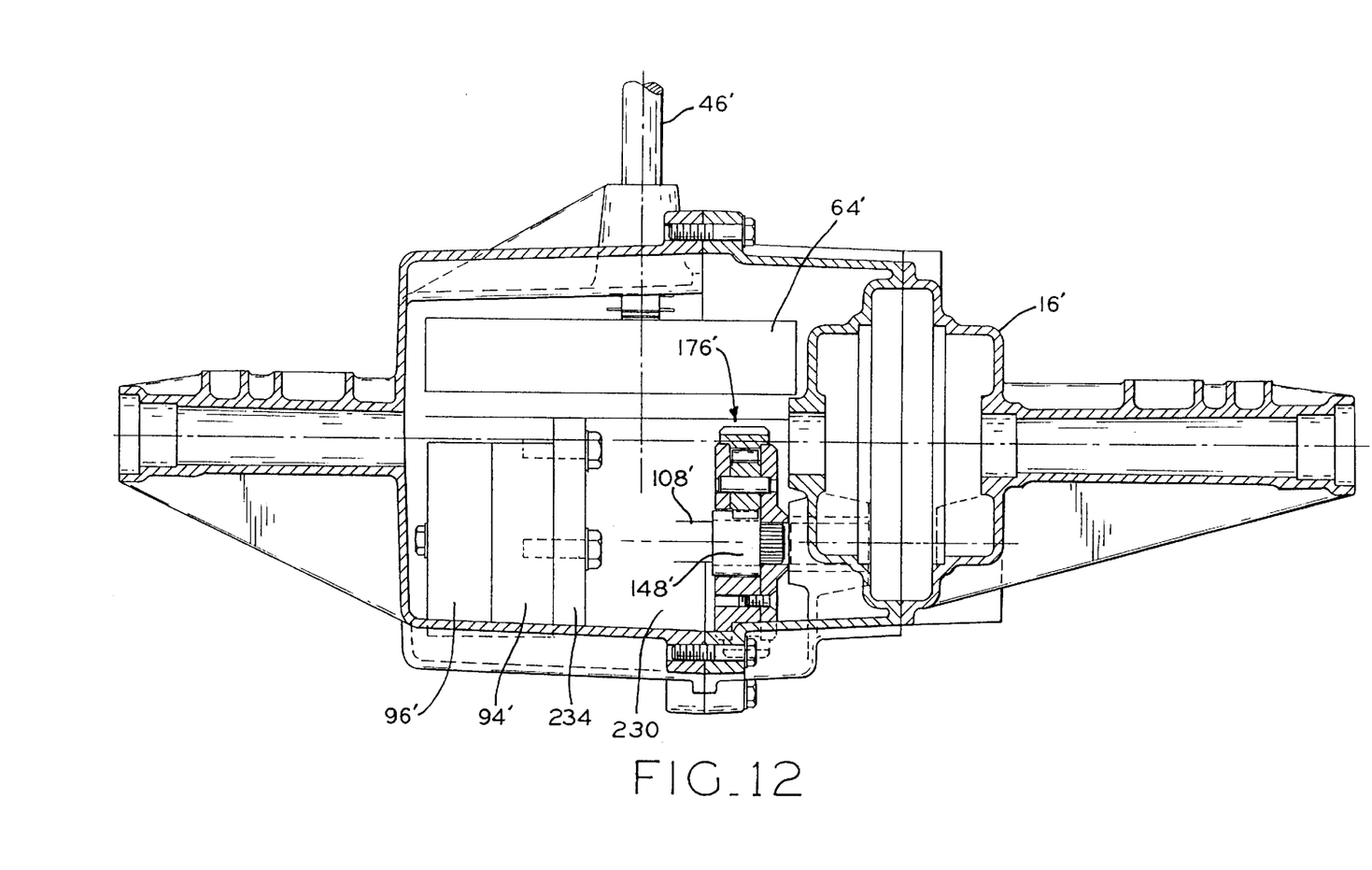
FIG. 12 is a sectional view of the second embodiment taken along a vertical plane intersecting the axes of the axles.
Figure 13:
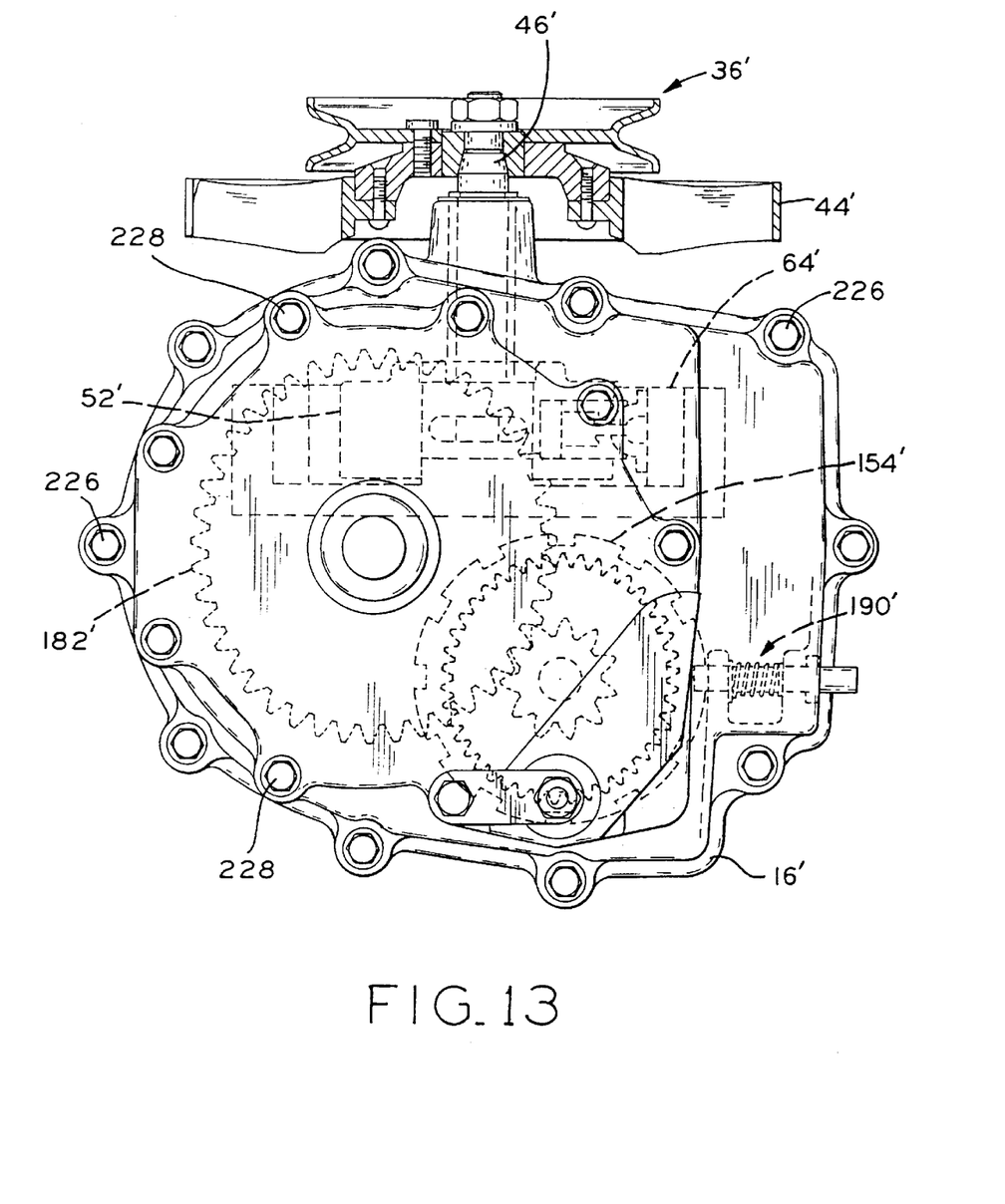
FIG. 13 is an end view of the second embodiment.

Whereas in the previous embodiment the pintle block 76 was bolted to mounting plate and cover 18, pintle block 230 in the embodiment of FIGS. 11–13 is inserted axially into transmission housing member 224 and fastened thereto by means of a plurality of bolts 232 extending through the flanges 234 of pintle block 230. Similarly to the previous embodiment, the output shaft 108' has a sun gear 148' formed on the end thereof and is in intermeshing engagement with the planet gears of planetary set 176' (FIGS. 11 and 12). Track ring 64' is guided between a pair of machined surfaces 236 formed in housing 224 (FIG. 11).

The embodiment illustrated in FIG. 11 includes a neutral position adjustment mechanism. Slidable track ring 64 includes a first detent member (incorporated in the illustrated embodiment as ball detent mechanism 242) extending therefrom. Housing member 220 defines a second detent member (incorporated in the illustrated embodiment as screw 238) adapted to releasably receive ball detent mechanism 242. Screw 238 has an adjustable position, whereby screw 238 can be positioned so that the transaxle is in neutral when ball detent mechanism 242 is received therein. Specifically, in order to adjust the neutral position of track ring 64' during assembly, screw 238 (FIG. 11) is threaded into housing member 224 and includes a V-shaped groove 240 therein. Ball detent mechanism 242 is received in a bore in track ring 64' and engages groove 240 in order to hold track ring 64' in the neutral position and provide a tactile indication to the operator when neutral is achieved. The neutral position of track ring 64' during assembly is achieved by adjusting the position of screw 238 until the transmission is in the neutral position, and then screw 238 is locked in place by means of a lock nut or other locking device. In the unlikely event that readjustment of the neutral setting is required in the field, this can be done by unlocking screw 238 and repositioning it as necessary.

While this invention has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hydrostatic transaxle, comprising:

an external casing;

a pair of axles and a differential disposed in said casing;

a hydrostatic transmission disposed in said casing and comprising an input shaft driving a pump, said input shaft having an input shaft axis, a hydraulic motor fluidly connected to said pump, said motor having a rotatable output member, said rotatable output member having an output member axis, said input shaft axis being substantially orthogonal to said output member axis; and an epicyclic gear mechanism drivingly connected between said output member and said differential, comprising a sun gear driven by said rotatable output member, a plurality of planet gears driven by said sun gear and a normally fixed internally toothed ring gear meshed with said planet gears, said planet gears supported on a carrier connected to said output member.

2. The transaxle of claim 1 wherein said ring gear is selectively unlocked to thereby permit said ring gear to rotate and effectively rotationally disconnect said hydrostatic transmission and said differential.

3. The transaxle of claim 1, further comprising a neutral position adjustment mechanism.

4. The transaxle of claim 1, wherein said casing comprises first and second housing members joined at an interface defining a substantially vertical plane, said substantially vertical plane intersecting said differential.

5. The transaxle of claim 1, wherein said casing comprises first and second housing members joined at an interface defining a substantially horizontal plane, said hydrostatic transmission supported by and vertically suspended from one of said first and said second housing members.

6. A hydrostatic transaxle comprising:

an external casing;

a pair of axles and a differential disposed in said casing;

said casing comprising interconnected first and second housing members, said first and second housing members defining a first interface therebetween, one of said first and second housing members including a hydrostatic transmission chamber;

said casing further including a support plate and cover member joined to said one of said first and second housing members and thereby defining a second interface therebetween; and a hydrostatic transmission connected to, supported by, and suspended from said support plate and cover member and being disposed in said hydrostatic chamber, said transmission drivingly connected to said differential and axle members and having an input shaft connected thereto.

7. The hydrostatic transaxle of claim 6, wherein said first interface lies in a substantially vertical plane.

8. The hydrostatic transaxle of claim 6, further comprising a pump being driven by said input shaft and a hydraulic motor fluidly connected to said pump, said motor having a rotatable output member, longitudinal axes of said output member and said input shaft being substantially perpendicular to one another.

9. The hydrostatic transaxle of claim 7, wherein said second interface lies in a substantially horizontal plane.

10. A hydrostatic transaxle comprising:
   an external casing;
   a hydrostatic transmission disposed in said casing and comprising an input shaft driving a pump and a hydraulic motor fluidly connected to said pump, said motor having a rotatable output member;
   an epicyclic gear mechanism drivingly connected between said output member and said differential, said epicyclic gear mechanism including a sun gear driven by said output member, a plurality of planet gears driven by said sun gear and a normally fixed internally toothed ring gear meshed with said planet gears, said planet gears supported on a carrier connected to said output member; and
   said ring gear being selectively unlocked to thereby permit said ring gear to rotate and effectively rotationally disconnect said hydrostatic transmission and said differential.

11. A hydrostatic transaxle, comprising:
   an external casing;
   a pair of axles and a differential disposed in said casing, said pair of axles meshingly engaged with said differential through an epicyclic gear mechanism;
   said casing comprising first and second housing members joined together along a first interface lying in a first plane, said first and second housing members containing a hydrostatic transmission; and
   a third housing member joined to at least one of said first and second housing members along a second interface lying in a second plane, said second plane being substantially vertical and intersecting said differential.

12. The hydrostatic transaxle of claim 11, wherein said first plane is substantially parallel to said second plane.

13. The hydrostatic transaxle of claim 11, wherein said first plane is substantially perpendicular to said second plane.

14. The hydrostatic transaxle of claim 11, further comprising an input shaft driving a pump, said input shaft having an input shaft axis, a hydraulic motor fluidly connected to said pump, said motor having a rotatable output member, said rotatable outlet member having an outlet member axis, said input shaft axis being substantially perpendicular to said outlet member axis.

15. The transaxle of claim 11, further comprising a neutral position adjustment mechanism.

16. The hydrostatic transaxle of claim 12, further comprising an input shaft driving a pump, said input shaft having an input shaft axis, a hydraulic motor fluidly connected to said pump, said motor having a rotatable output member, said rotatable outlet member having an outlet member axis, said input shaft axis being substantially perpendicular to said outlet member axis.

17. The hydrostatic transaxle of claim 13, further comprising an input shaft driving a pump, said input shaft having an input shaft axis, a hydraulic motor fluidly connected to said pump, said motor having a rotatable output member, said rotatable outlet member having an outlet member axis, said input shaft axis being substantially perpendicular to said outlet member axis.

18. A hydrostatic transaxle, comprising:
   an external casing;
   a pair of axles and a differential disposed in said casing;
   a hydrostatic transmission disposed in said casing and comprising an input shaft driving a pump, said input shaft having an input shaft axis, a hydraulic motor fluidly connected to said pump, said motor having a rotatable output member, said rotatable outlet member having an outlet member axis, said input shaft axis being substantially orthogonal to said outlet member axis;
   an epicyclic gear mechanism drivingly connected between said output member and said differential, said epicyclic gear mechanism includes a sun gear driven by said rotatable output member, a plurality of planet gears driven by said sun gear and a normally fixed internally toothed ring gear meshed with said planet gears, said planet gears supported on a carrier connected to said output member, said ring gear is selectively unlocked to thereby permit said ring gear to rotate and effectively rotationally disconnect said hydrostatic transmission and said differential; and
   a means for selectively unlocking said ring gear comprising:
      a plurality of slots disposed on said ring gear; and
      a slidable pin disposed to selectively engage any one of said slots,
   whereby disengagement of said pin from said one slot unlocks said ring.

19. A hydrostatic transaxle comprising:
   an external casing;
   a pair of axles and a differential disposed in said casing;
   said casing comprising interconnected first and second housing members, said first and second housing members defining a first interface therebetween, one of said first and second housing members including a hydrostatic transmission chamber;
   said casing further including a support plate and cover member joined to said one of said first and second housing members and thereby defining a second interface therebetween; and
   a hydrostatic transmission connected to, supported by, and suspended from said support plate and cover member and being disposed in said hydrostatic chamber, said transmission drivingly connected to said differential and axle members and having an input shaft connected thereto;
   wherein said support plate and cover member comprises a pair of surfaces depending therefrom, said pair of surfaces capturing a track ring therebetween and providing a rectilinear path for rectilinear movement of said track ring, whereby said rectilinear movement changes the eccentricity between an interior surface of said track ring and said input shaft.

20. A hydrostatic transaxle comprising:

an external casing;

a hydrostatic transmission disposed in said casing and comprising an input shaft driving a pump and a hydraulic motor fluidly connected to said pump, said motor having a rotatable output member;

an epicyclic gear mechanism drivingly connected between said output member and said differential, said epicyclic gear mechanism including a sun gear driven by said output member, a plurality of planet gears driven by said sun gear and an internally toothed ring gear meshed with said planet gears, said planet gears supported on a carrier connected to said output member;

said ring gear being selectively unlocked to thereby permit said ring gear to rotate and effectively rotationally disconnect said hydrostatic transmission and said differential; and a means for selectively unlocking said ring gear comprising a plurality of slots disposed on said ring gear, and a slidable pin disposed to selectively engage any one of said slots, whereby disengagement of said pin from said one slot unlocks said ring.

21. A hydrostatic transaxle, comprising:

an external casing;

a pair of axles and a differential disposed in said casing;

said casing comprising first and second housing members joined together along a first interface lying in a first plane, said first and second housing members containing a hydrostatic transmission;

a third housing member joined to at least one of said first and second housing members along a second interface lying in a second plane, said second plane being substantially vertical and intersecting said differential; and a slidable track ring having a first detent member extending therefrom, one of said first and said second housing members defining a second detent member adapted to releasably receive said first detent member, said second detent member having an adjustable position, whereby said second detent member can be positioned so that said transaxle is in neutral when said first detent member is received in said second detent member.

* * * * *

UNITED STATES PATENT AND TRADEMARK OFFICE
CERTIFICATE OF CORRECTION

PATENT NO.   : 6,151,990
DATED        : December 13, 2000
INVENTOR(S)  : Kevin L. Johnson

It is certified that error appears in the above-identified patent and that said Letters Patent is hereby corrected as shown below:

Please change the name of the inventor to: Kevin L. Johnson

Signed and Sealed this

Twenty-fifth Day of September, 2001

Attest:

NICHOLAS P. GODICI
Attesting Officer *Acting Director of the United States Patent and Trademark Office*